United States Patent [19]

Morten

[11] Patent Number: 4,587,600

[45] Date of Patent: May 6, 1986

[54] LIGHTING FIXTURE

[76] Inventor: John Morten, 11 Glen St., Dover, Mass. 02030

[21] Appl. No.: 728,826

[22] Filed: Apr. 30, 1985

[51] Int. Cl.$^4$ .................. F21V 13/00; F21V 23/00
[52] U.S. Cl. .................. 362/219; 362/222; 362/224; 362/362; 362/812
[58] Field of Search .......... 362/31, 217, 219, 221–225, 362/260, 362, 367, 812

[56] References Cited

U.S. PATENT DOCUMENTS

| | | | |
|---|---|---|---|
| 2,309,059 | 1/1943 | Friend | 362/224 |
| 2,524,353 | 10/1950 | Locke | 362/225 |
| 2,893,148 | 7/1959 | Figman | 362/812 X |
| 4,282,564 | 8/1981 | McJunkin, Jr. et al. | 362/225 X |
| 4,415,957 | 11/1983 | Schwartz | 362/217 X |

FOREIGN PATENT DOCUMENTS 648139 9/1962 Canada .................. 362/223

Primary Examiner—Tony M. Argenbright
Attorney, Agent, or Firm—Wolf, Greenfield & Sacks

[57] ABSTRACT

A lighting fixture in the form of a support frame having top and bottom walls that are interconnected with end support pieces and that have open sides through which the light is dispersed. A series of three elongated fluorescent lamps are mounted in the support frame supported between end support pieces, a translucent cover in two pieces is disposed about the support frame over the respective open sides. Mirrors are disposed in the support frame including a top mirror on the frame top wall and the bottom mirror on the frame bottom wall. The combination of properly positioned lamps and mirrors provides light output that is uniformly dispersed through the covers. In one embodiment, an exit sign is mounted under the fixture and a slot is provided for directing a light path directly to the side.

18 Claims, 8 Drawing Figures

U.S. Patent  May 6, 1986  Sheet 1 of 4  4,587,600
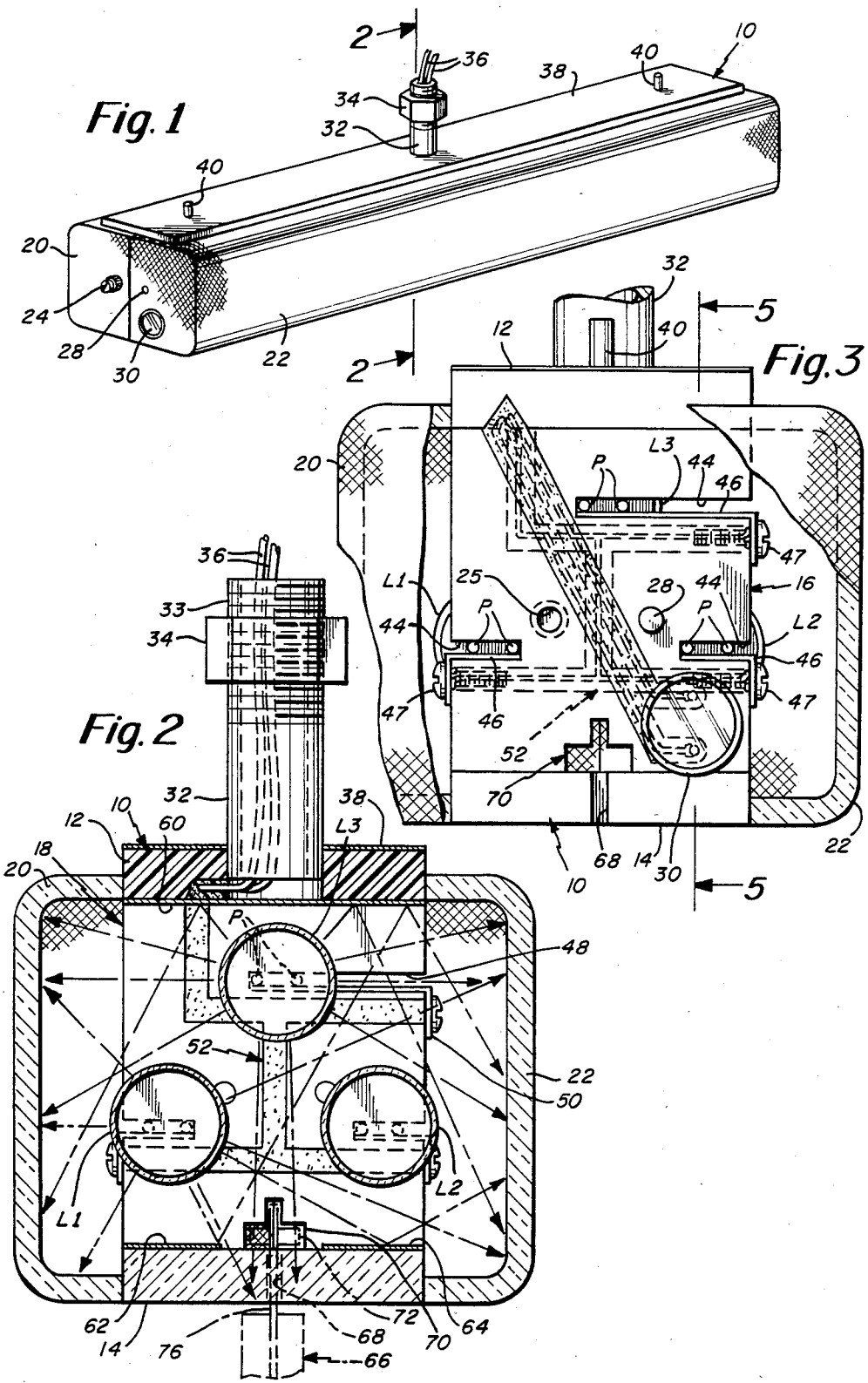

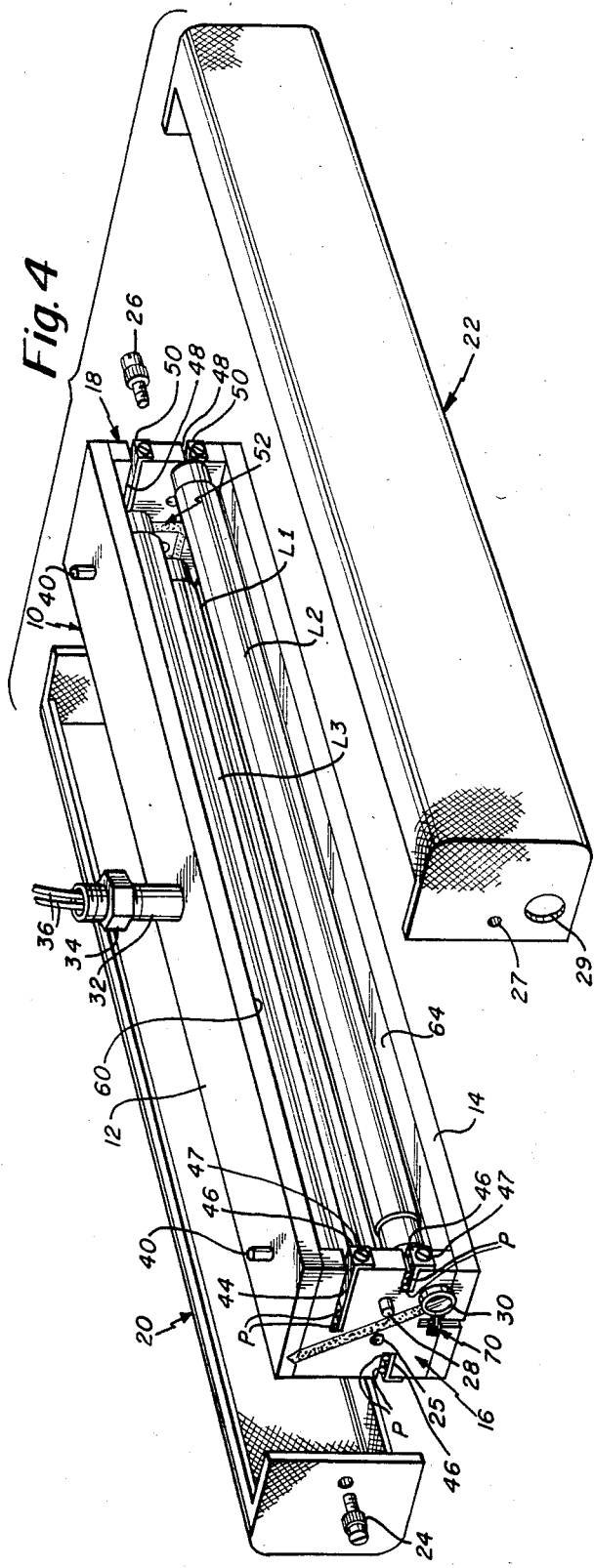

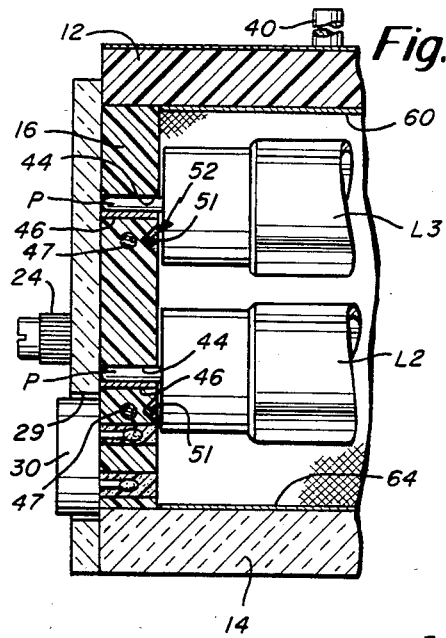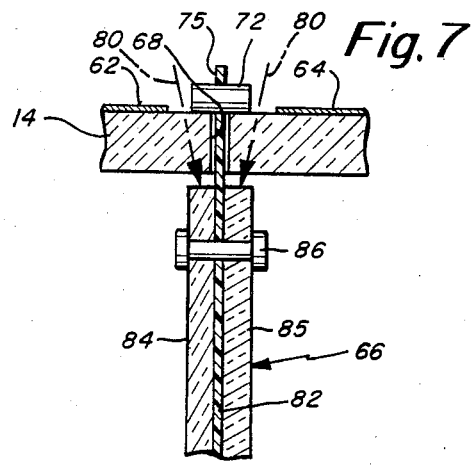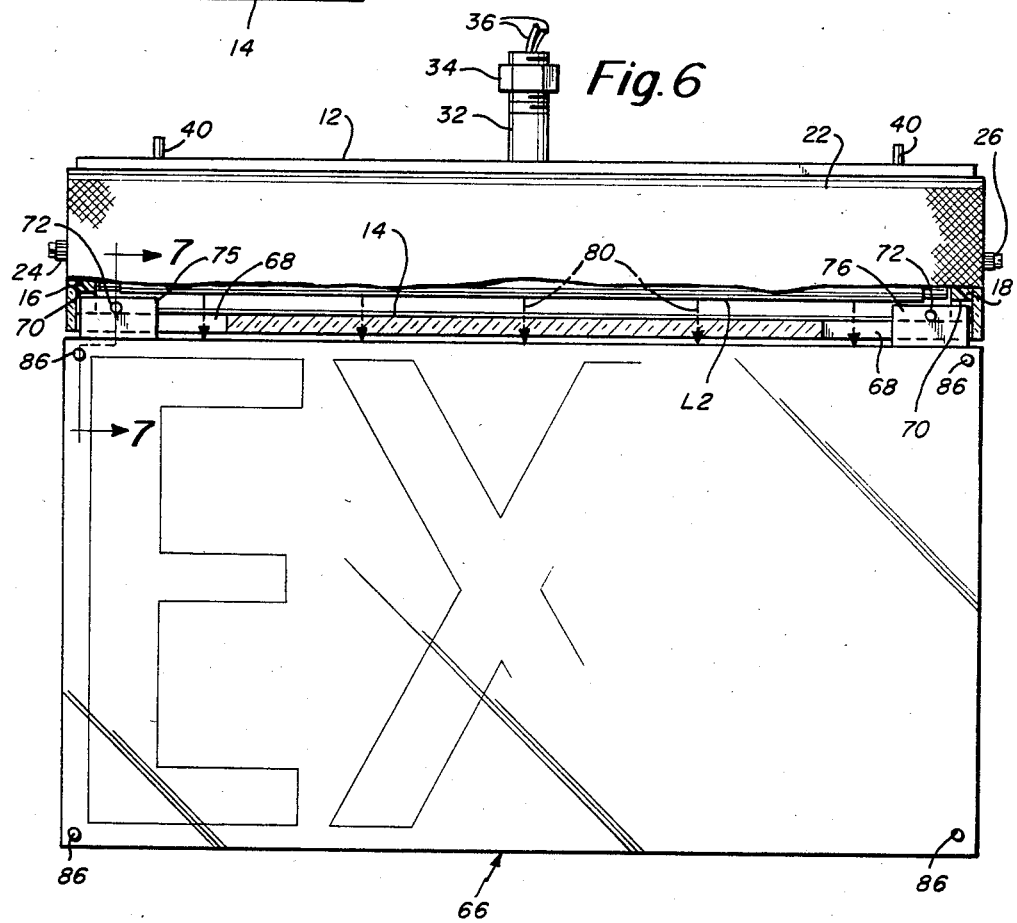

LIGHTING FIXTURE

BACKGROUND OF THE INVENTION

The present invention relates in general to a lighting fixture and pertains, more particularly, to a fluorescent lighting fixture that is very efficient in operation and preferably supports multiple fluorescent lamps. Even more particularly, the invention also relates to the combination of an efficient lighting fixture with a sign that is adapted for illumination by the fixture.

Present lighting fixtures usually require a substantial amount of maintenance including the changing of lamps that have to be changed quite often, particularly in order to maintain a proper light level from the fixture.

In a related matter, pertaining to signs and in particular, exit signs, it is common for these exit signs to have their own integral form of illumination which furthermore requires excessive maintenance. This is particularly important with exit signs as there is a definite safety hazard should these signs not be properly illuminated.

Accordingly, it is an object of the present invention to provide an improved lighting fixture, one having improved efficiency, and in particular, one that essentially provides for automatic re-lamping.

Another object of the present invention is to provide a lighting fixture in which, even when one or more of the lamps are out, there is sufficient light level remaining. This thus means that the fixture can be used for a number of years, even before re-lamping is required.

A further object of the present invention is to provide, in a lighting fixture, a unique mirror arrangement that essentially provides for a bending of light around lamps which are not illuminated. This thus provides light uniformity in all directions from the fixture even should one of the lamps be out.

Still another object of the present invention is to provide an improved fixture in accordance with the preceding object in which the fixture realizes more lumens out of the fixture.

Another object of the present invention is to provide a more universal lighting fixture in which the fixture is readily convertible from an area light to an exit light or in particular to a combination area and exit light while still retaining the lumen distribution of the area light. In other words, with the improved fixture of the present invention, the exit sign or other like sign can be readily illuminated without substantially effecting the area lighting coming from the fixture.

Still another object of the present invention is to provide an improved lighting fixture having associated therewith a sign means preferably in the form of an exit sign that is adapted to slide into the fixture and be locked in place.

Another object of the present invention is to provide, in a lighting fixture, a particular arrangement of multiple lamps in combination with mirrors disposed in a particular pattern for directly light down through the edge of the sides supported therebelow to provide attractive edge lighting of letters and the outside border. Furthermore, this lighting is provided regardless of which lamp is illuminated because of the particular positional arrangement of lamps as in accordance with the present invention.

A further object of the present invention is to provide a fluorescent lighting fixture that is substantially entirely constructed of hard plastic material, that is tough, resilient and virtually indestructible.

Still a further object of the present invention is to provide a combination lighting fixture and sign in which the sign is also constructed of a rigid plastic material and is adapted to readily swing on its support hinges should it be struck or moved in any manner.

Another object of the present invention is to provide a combination lighting fixture and sign in which the sign itself is not using any energy for illumination thereof on its own. There is no need for a separate lamp to replace and no maintenance with the sign itself. All of the illumination for the sign is coupled directly from the lighting fixture itself.

A further object of the present invention is to provide, in combination with the lighting fixture, a miniaturized ballast which is encapsulated, with molded in connectors and which assembles quickly and can be replaced rapidly without extensive tools.

Still another object of the present invention is to provide a lighting fixture which installs quite readily to the ceiling. The installation is usually through a pierced hole in a ceiling tile without requiring the need of any special tools. Also, the installation does not require any disassembly and reassembly of the fixture itself.

A further object of the present invention is to provide, in combination with the lighting fixture, a built in light sensor with associated trim pot in series therewith. This built-in light sensor automatically turns the lamp on when ambient light is dark. This saves lamp life by turning the lamp off when ambient light is sufficient. The light sensor feature may be by-passed also.

Still another object of the present invention is to provide a lighting fixture in which most of the component parts are constructed of a rigid plastic that is designed for years of service and in which many of the components can be quickly replaced without the need for any tools at all.

Still another object of the present invention is to provide, in combination with the improved lighting fixture, a low profile ballast mounted on top of the fixture rather than above the ceiling tile.

SUMMARY OF THE INVENTION

To accomplish the foregoing and other objects, features and advantages of the invention, there is now provided in accordance with the present invention, a lighting fixture that comprises a support frame having top and bottom walls interconnected with end support pieces and together defining an illuminating compartment therebetween. This support frame is constructed of rigid plastic insulating material such as Lexan. The support frame has open sides through which the light illumination occurs. There is disposed within the support frame, at least one elongated lamp which is preferably a fluorescent lamp and which is supported between the end support pieces. In a preferred embodiment of the present invention as described herein, there are actually provided three lamps, each disposed in parallel to each other, and disposed in a triangular pattern, having two lower disposed lamps forming the base of the triangle and a third middle lamp defining the apex of the triangle. Means are provided for enabling excitation of the lamp such as with the use of a ballast and input AC source. A translucent cover means is disposed about the support frame over the open sides thereof. This translucent cover means preferably comprises separate light-diffusing covers, one disposed on one open side of the frame and the other disposed on the other open side of the frame. These separate light diffusing covers are essentially mated together and it is through these covers that the light diffuses. Within the support frame, there is also provided a mirror means adjacent the lamps and including a top mirror on the frame top wall and a bottom mirror on the frame bottom wall. These mirrors are in facing relationship to each other and are of course facing into the referenced illuminating compartment. In accordance with the invention, the lamps are disposed in the pattern previously referred to so that should any one lamp go out with the combination of lamps remaining and reflective surfaces, the light illumination from the overall fixture is not decreased by the amount of the lumens from the lamp that is extinguished. In other words, even though a lamp may go out, the uniformity of light distribution is not materially effected.

In accordance with another feature of the present invention, there is provided a combination lighting fixture and sign. In accordance with the invention, the principles thereof can be practiced in one embodiment without the use of a sign, but in a second embodiment as now described, there is a combination of lighting fixture and sign. The sign is typically an exit sign that does not in itself have any means of illumination, but instead is supported from the underside of the lighting fixture and is adapted to have a portion of the illumination from the lighting fixture directed essentially into the sign for causing illumination thereof. In this regard, the bottom wall of the support frame has a slot for enabling support of the sign and this slot also provides a light transmission path from the illuminating compartment of the fixture to the sign directly. In accordance with the invention, there is also a unique means for sign support comprising a top flexible plastic hinge which is employed in combination with a pin for supporting the hinge with the pin disposed in a side slot of the bottom wall. The pin and hinge for a cross that is adapted to slide into a cross-shaped recess in the bottom wall of the support frame. The cover has ends so that once the sign is in place, the cover is disposed over the support frame and locks the sign in place preventing end movement thereof. The hinging arrangement of the sign provides flexibility and enables the sign to be deflected without any damage thereto without any damage to the fixture itself.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view showing the lighting fixture of the present invention in its assembled position;

FIG. 2 is a cross-sectional view through the lighting fixture of FIG. 1 as taken along line 2—2 of FIG. 1 and illustrating the exit sign in phantom;

FIG. 3 is a left end view of the fixture of FIG. 1 partially broken away to illustrate further details of the lighting fixture;

FIG. 4 is an exploded perspective view of the lighting fixture of FIG. 1;

FIG. 5 is a cross-sectional view taken along line 5—5 of FIG. 3;

FIG. 6 is a partial cross-sectional view taken at the sign illustrating the manner in which the light rays illuminate the sign;

FIG. 7 is a further detailed cross-sectional view taken along line 7—7 of FIG. 6.

DETAILED DESCRIPTION

Figure 8:
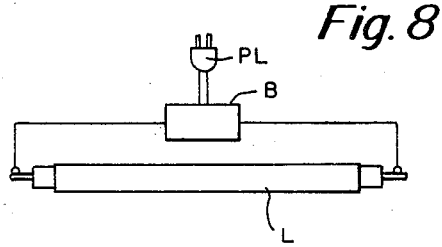
FIG. 8 is a simple schematic block diagram illustrating the lamp circuit.

There is now described herein a preferred embodiment of a lighting fixture that may either be used alone as an area light, or may be used as a combination area light and sign illuminator. For example, the typical exit sign that is used in buildings, particularly public or commercial buildings, is very typically illuminated by its own light source, whereas, in accordance with the present invention, we now provide a means by which the exit sign can be illuminated directly from an area light. Also, in accordance with the invention, the area light itself is adapted for improved operation, particularly improved uniformity of light distribution, which uniformity is carried out regardless of whether all of the lamps are illuminated or not.

In accordance with the invention, the lamps are preferably three lamps and they are disposed in a particular pattern so that with the combination of mirrors, light is essentially bent around lamps which are not illuminated. The fixture directs light uniformly in all directions from the fixture even under conditions of lamp outage.

Referring now in particular to the drawings, the lighting fixture comprises a support frame 10. The support frame 10 is comprised of substantially all hard plastic materials. In constructing the fixture of the present invention, there has been used primarily, Lexan. Thus, the support frame comprises a top wall 12, a bottom wall 14, and end support pieces 16 and 18. The top and bottom walls and the end support pieces may be interconnected in any suitable manner. FIG. 4 illustrates the basic support frame with the top and bottom walls and the end support pieces 16 and 18. It is noted in particular in FIG. 4 that the support frame has open sides. These open sides are adapted to be covered by the translucent cover means. This cover means includes a light diffusing cover 20 and mating light diffusing cover 22. Each of the covers 20 and 22 has ends at which the cover is secured to the support frame. For example, in FIG. 4 there is shown a screw 24 that passes through an end of the cover 20 and secures the cover to the end support piece 16. In this regard, note in FIG. 4 the screw hole 25. Similarly, there is also a screw 26 associated with cover 22 for securing one end of the cover 22 to the other end support piece 18. The opposite ends of the covers each have a hole such as the hole 27 in cover 22 which is engaged with the pin 28 extending from the end support piece 16. It is further noted in FIG. 4 that the cover 22 has a larger diameter hole 29 which is adapted to receive the light sensor 30. Further details of the light sensor are found in FIG. 5 and are described hereinafter.

The top wall 12 supports at the midpoint thereof, a post 32. The post 32 is threaded at its top end at 33 and is illustrated as having engaged therewith a securing nut 34. The post 32 is hollow and has extending therethrough wires 36 which are adapted to bring power to the fixture. These wires may extend in grooves that run longitudinally in the top wall 12. The wires are adapted to extend to either end of the lamps for coupling power to the lamps.

The top wall 12 also preferably has on the top surface thereof, a reflective mylar tape 38. Also, as illustrated in FIG. 1, there are a pair of alignment pins 40. When the fixture is used with a ballast, the alignment pins 40 may be used to properly align the ballast with this fixture. In this connection, the ballast, (not specifically shown in FIG. 1) is adapted to be mounted on the top of the fixture.

Reference is now made to FIGS. 2-5 which clearly illustrate the lamp support arrangement. In this connection there are provided three lamps L1, L2, and L3. Each of these lamps may be standard fluorescent lamps, having at each end, double prongs such as the prongs P illustrated in FIG. 3. With reference to FIGS. 3 and 4, it is noted that each of the end support pieces 16 and 18 have horizontal slots. Each of these slots carry brass contacts. Thus, with regard to the end piece 16, there are three slots 44. Each of these slots has associated therewith a brass contact 46. The pairs of prongs of the lamps are adapted to contact these brass contacts.

At the other end piece 18 there similarly are horizontal slots 48. Each of these also has associated therewith a brass contact 50. With regard to the wiring that is run in the fixture, reference may also be made to FIG. 3. There is illustrated therein, in the end piece 16 a groove at 52 which is filled with epoxy and in which the wiring runs. This couples wires to the contacts 46. A similar groove is also employed in association with the end piece 18 so as to run wires to the contacts 50. In this connection, reference is also made to FIG. 5 which also shows the wires 51 encapsulated in epoxy within the end piece 16 and for coupling to the contacts 46. FIG. 5 also illustrates the screws 47 that are associated with each of the respective contacts 46. Also noted in FIG. 5 is the light sensor 30. The light sensor may be a conventional sensor having prongs associated therewith, accommodated in recesses in the end support piece 16. These recesses are illustrated in FIG. 5 as being epoxy filled. Wiring couples to the light sensor also and the light sensor is used to control the current coupled to the lamps. When there is sufficient ambient light in the room, the the light sensor interrupts current flow to the lamps.

Within the illuminating compartment defined by the support frame, there is provided mirror means including a planar mirror 60 that is suitably secured to the underside of the top wall 12. Similarly, there is also a mirror on the top surface of the bottom wall 14. This mirror is actually in mirror segments 62 and 64. These mirror segments are used in the embodiment in which the side is supported under the fixture. In this connection, refer to FIG. 2 which shows in phantom, the sign at 66. In one embodiment of the invention in which the sign is not to be used, then in place of the mirror segments 62 and 64, there may be a single mirror similar to the mirror 60 used in association with the top wall 12. In the embodiment of the invention illustrated in FIG. 2 wherein the exit sign 16 is employed, then there is a gap between the mirror segments. This gap enables the transmission of light through the elongated slot 68 that runs substantially the length of the bottom wall 14. It is noted that in the end pieces 16 and 18, there is a cross-shaped slot such as illustrated at 70 in FIG. 3. This slot is for accommodating a means for supporting the sign which includes a pin 72 illustrated in FIGS. 2 and 7.

Reference is also now made to FIGS. 6 and 7 which illustrated the basic manner of support of the sign 66 from the lighting fixture. This support is carried out by means of oppositely disposed hinges 75 and 76. The hinge 75 such as illustrated in FIG. 7 receives one of the pins 72. The pin 72 along with the hinge 75 are adapted to pass into the cross-shaped slot 70 in one of end pieces 16 or 18. The pin 72 is then slid along the top surface of the bottom wall 14 as the sign is slid essentially along the length of the slot 68. The other hinge is then also engaged through the same end piece and the sign essentially disposed at a position as illustrated in FIG. 6.

It is noted in FIG. 6 that the hinges 75 and 76 only appear at the end of the exit sign and thus there is no substantial interference as far as the light transmission is concerned from the area of the lamps to the sign directly. In FIG. 6, note the arrows 80 which illustrate the light rays emanating from the illuminating compartment and passing through the slot 68 that runs the substantial length of the bottom wall 14 of the support frame.

FIG. 7 illustrates the form of the sign. This is formed by means of essentially three layers including an intermediate layer 82 which is the layer that carries the indicia which in this instance is simply the word EXIT. On either side of the layer 82 are outer hard plastic layers 84 and 85. These layers may be of $\frac{1}{8}''$ Lexan. Plastic rivets 86 are used to secure these different layers together. The layers 84 and 85 are of substantially clear plastic and thus the rays 80 that emanate from the fixture are directed directly at the top edge of the sign where these rays emanate essentially through the sign and illuminate the nomenclature. This nomenclature is preferably the same on either side of the sign or in other words, the indicia used in association with the layer 82 may be disposed on either side thereof so that the exit sign can be read from either direction.

FIG. 8 is a simple block diagram illustrating one of the lamps L with an associated ballast B coupled to an AC source by means of the plug PL. When using a light sensor 30, then of course, which would be included in the circuit to interrupt current to the lamp unless the ambient light was of a sufficiently low level.

One of the important features of the present invention has to do with the particular lamp placement that is selected so as to assure that there will be a relative uniformity of light output particularly out either side of the lamp through the covers 20 and 22. When all three of the lamps L1-L3 are illuminated as illustrated in FIG. 2, then it can be seen that the lamp that the overall fixture illumination is uniform out either side of the lamp. If the lamp L3 goes out, it is noted that the lamps L1 and L2 still provide illumination out the side of the fixture and as a matter of fact, light will be reflected from lamps L1 and L2 at the surface of mirror 60 out the sides through the covers 20 and 22.

Should one of the lamps L1 and L2, such as lamp L1 go out, then the lamp L3 still maintains illumination out either side. The lamp L2 also illuminates through the cover 22 certainly, but there is furthermore, illumination off of the mirrors 60, 62, and 64 from lamp L2 so that there is also a substantial amount of illumination that occurs through the cover 20. Thus, the combination of the lamp placement and the mirrors essentially bend the light around lamps which are not illuminated.

Even in the instance where two lamps are extinguished, if, for example, lamps L1 and L2 are out, then there still is a uniformity of light distribution between the two sides of the fixture. If lamps L1 and L3 are out, then there would be at least some degree of uniformity from lamp L2 by virtue of the placement of the mirrors 60, 62, and 64. As a matter of fact in FIG. 2 there is illustrated by arrows, the rays that are possible from some of these lamps. For example, if lamp L2 is out, it is noted that lamp L1 has rays that are directed off of mirror surfaces 62 and 64 at least that cause illumination out through the cover 22. Of course, lamp L1 also directly couples light through the cover 20.

FIG. 2 also illustrates principles relating to the illumination of the sign 66. Certainly, if only the lamp L3 is illuminated, then there is direct light in a vertical sense from the lamp L3 to the slot 68 and from there to the sign 66. If the lamp L3 is out and either lamps L1 or L2 or both of them are on, then the light rays can be reflected off of the mirror surface 60 and reflected back downwardly into the slot 68 for causing illumination of the sign.

Having now described a preferred embodiment of the present invention, it should now be apparent to those skilled in the art that numerous other embodiments and modifications thereof are contemplated as falling within the scope of the present invention as defined by the appended claims.

What is claimed is:

1. A lighting fixture comprising;
a support frame having top and bottom walls interconnected with end support pieces and defining an illuminating compartment therebetween,
said support frame having open sides,
at least one elongated lamp disposed in said illuminating compartment and supported between said end support pieces,
means for enabling excitation of the lamp,
translucent cover means disposed about said support frame over the open sides thereof,
and mirror means disposed in the support frame adjacent said lamp and including a top mirror on the frame top wall and a bottom mirror on the frame bottom wall,
whereby the light output from the illuminating compartment is uniformly dispersed through the translucent cover means.

2. A lighting fixture as set forth in claim 1 comprising a plurality of lamps supported in the illuminating compartment in spaced relationship therebetween.

3. A lighting fixture as set forth in claim 2 wherein the number of lamp comprise at least three disposed in parallel and in a triangular pattern having two lamps equally spaced from one of the mirrors and the third lamp spaced more closely to the other mirror than the one mirror.

4. A lighting fixture as set forth in claim 3 wherein said third lamp is disposed at a center line of the mirrors and the first and second lamps are disposed on either side of the center line, respectively.

5. A lighting fixture as set forth in claim 4 wherein the two lamps are equally spaced from the bottom mirror while the third lamp is closer to the top mirror.

6. A lighting fixture as set forth in claim 5 wherein the mirrors are all planar.

7. A lighting fixture as set forth in claim 1 wherein the translucent cover means comprises separate light-diffusing covers, one disposed on one open side of the frame and the other disposed on the other open side of the frame.

8. A lighting fixture as set forth in claim 7 in combination with a sign means and means supporting the sign means from the support frame bottom wall.

9. A lighting fixture as set forth in claim 8 wherein said bottom wall has a slot for enabling support of the sign means and providing a light transmission path from the illuminating compartment to the sign means.

10. A lighting fixture as set forth in claim 9 wherein the sign means has a top support hinge and pin means supporting the hinge with the pin means disposed in a side slot of the bottom wall.

11. A lighting fixture as set forth in claim 10 wherein the covers have ends that cover the bottom wall slot to prevent the sign means from dislodging from the support frame.

12. A lighting fixture as set forth in claim 1 wherein the mirrors are each planar with the mirrors disposed facing each other and into the illuminating compartment.

13. A lighting fixture as set forth in claim 12 wherein the bottom mirror and bottom wall each have a slot therein for enabling illumination of a sign supported below the support frame.

14. A lighting fixture as set forth in claim 12 wherein the sign has a top support hinge and pin means supporting the hinge with the pin means disposed in a side slot of the bottom wall.

15. A lighting fixture as set forth in claim 14 wherein the covers have ends that cover the bottom wall slot to prevent the sign from dislodging from the support frame.

16. A lighting fixture comprising;
a support frame having top and bottom walls interconnected with end support pieces and defining an illuminating compartment therebetween,
said support frame having open sides through which the primary illumination occurs,
at least one elongated lamp disposed in said illuminating compartment and supported between said end support pieces,
means for enabling excitation of the lamp,
translucent cover means disposed about said support frame over the open sides thereof,
a sign,
a means supporting the sign from the support frame,
said support frame bottom wall having slot means enabling light transmission for illumination of said sign.

17. A light fixture as set forth in claim 16 including mirror means disposed in the support frame adjacent said lamp and including a top mirror on the frame top wall and a bottom mirror on the frame bottom wall, said bottom mirror also having a slot for enabling light transmission to illuminate said sign.

18. A light fixture as set forth in claim 16 comprising at least three lamps disposed in parallel and in a triangular pattern having two lamps equally spaced from one of the mirrors and the third lamp spaced more closely to the other mirror than the one mirror wherein the third lamp is disposed at a center line of the mirrors and the first and second lamps are disposed on either side of the center line, respectively.

* * * * *